(12) United States Patent
Omps

(10) Patent No.: US 7,621,492 B2
(45) Date of Patent: Nov. 24, 2009

(54) MAGNETIC MOUNTING ASSEMBLY

(76) Inventor: Justin T. Omps, 600 Water St., NBU 2-14, Washington, DC (US) 20024

( * ) Notice: Subject to any disclaimer, the term of this patent is extended or adjusted under 35 U.S.C. 154(b) by 512 days.

(21) Appl. No.: 11/641,829

(22) Filed: Dec. 20, 2006

(65) Prior Publication Data

US 2007/0114346 A1     May 24, 2007

Related U.S. Application Data

(63) Continuation-in-part of application No. 10/321,511, filed on Dec. 18, 2002, now Pat. No. 7,163,181.

(51) Int. Cl.
    *F16M 11/02*     (2006.01)
(52) U.S. Cl. ............................. 248/181.1; 248/288.31
(58) Field of Classification Search ............. 248/181.1, 248/288.31, 288.51, 181.2, 182.1, 187.1; 396/198, 544; 403/56, 76, 90, 122, 144, 403/DIG. 1
See application file for complete search history.

(56) References Cited

U.S. PATENT DOCUMENTS

| | | |
|---|---|---|
| 318,480 A | 5/1885 | Kendrick |
| 3,286,212 A | 11/1966 | Thompson et al. |
| 4,719,549 A | 1/1988 | Apel |
| 5,772,164 A | 6/1998 | Shen |
| 5,790,910 A | 8/1998 | Haskin |
| 6,209,830 B1 | 4/2001 | Brotz |
| 6,350,076 B1 | 2/2002 | Wagner et al. |
| 6,352,228 B1 | 3/2002 | Buerklin |
| 6,439,518 B2 | 8/2002 | Brotz et al. |

FOREIGN PATENT DOCUMENTS

FR     2660 589     11/1991

*Primary Examiner*—Gwendolyn Baxter
(74) *Attorney, Agent, or Firm*—Joan K. Lawrence, Esq.

(57) ABSTRACT

An improved magnetic mounting assembly for securely attaching a positionable object to be variably fixed in a desired selected position to a support, for universally moving the positionable object to a desired selected position, and for holding the positionable object during operation is provided, including a positioning element with a magnetizable ball attached to the positionable object. A support element includes a nonmagnetizable outer housing supporting a magnetizable inner housing with surfaces configured to support the magnetizable ball. A magnet assembly positioned within the inner housing includes a magnet in contact with the inner housing and a magnetizable cap spaced a functionally optimum distance from the inner housing and from the ball to produce the magnetic forces required to magnetize the inner housing, the cap portion and the ball so that the ball is securely but movably held in the mounting assembly.

16 Claims, 4 Drawing Sheets

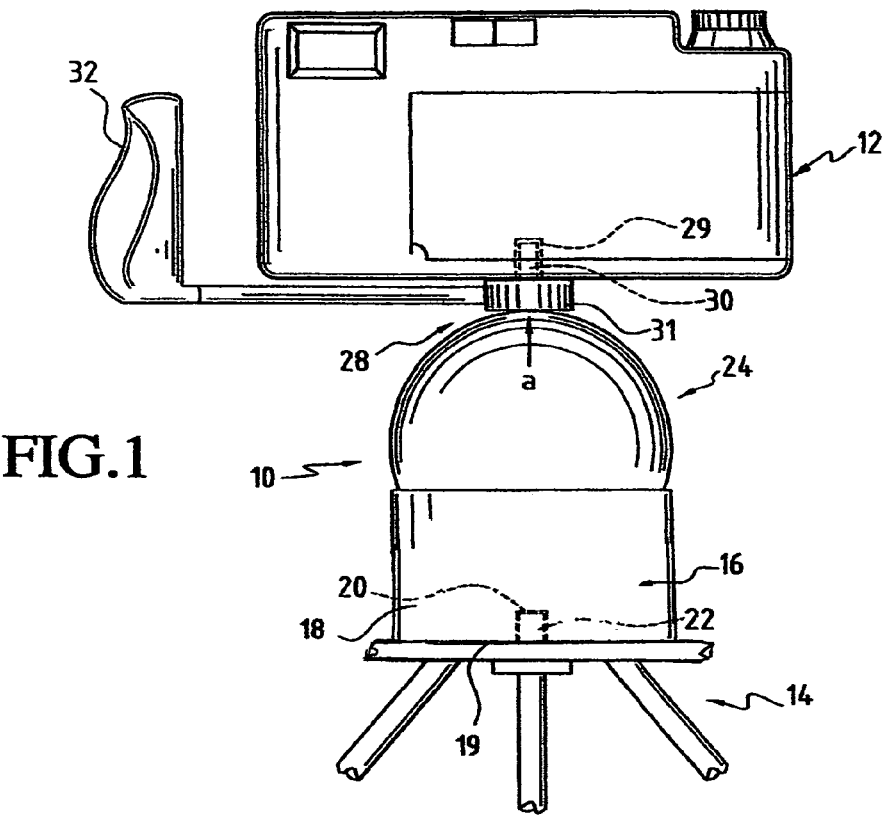
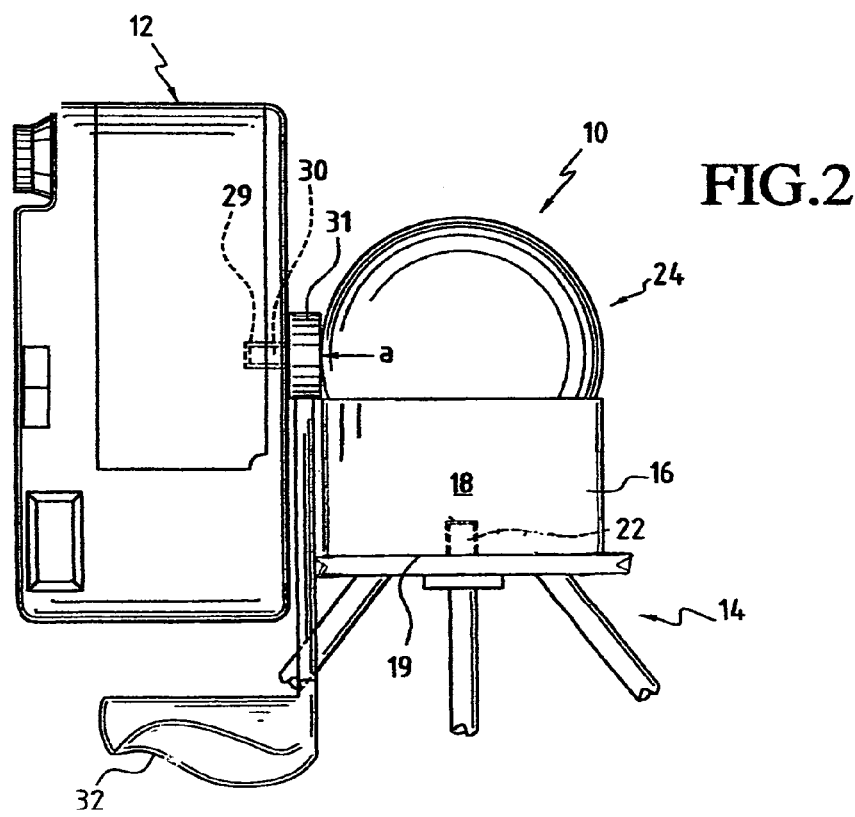

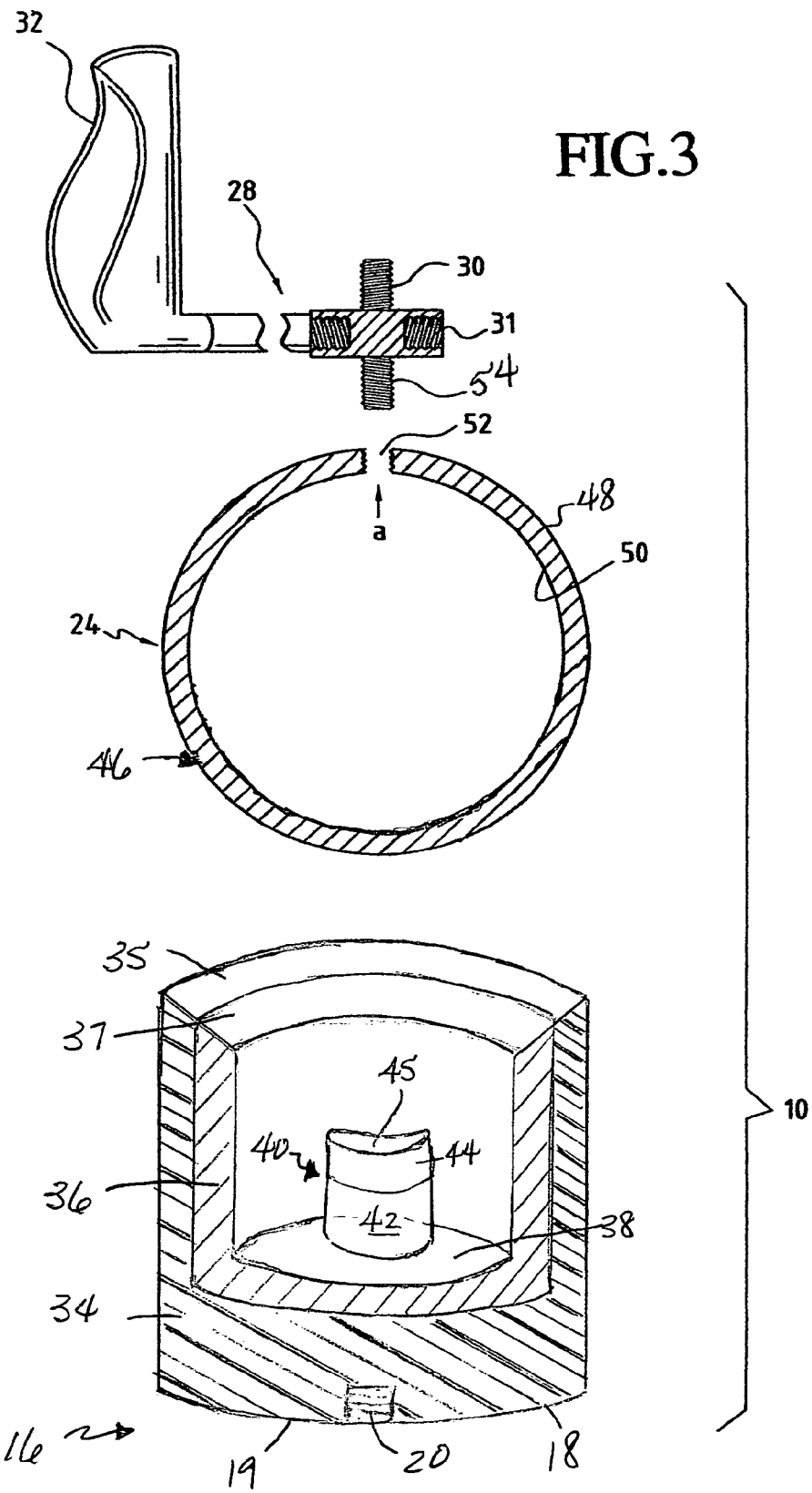

MAGNETIC MOUNTING ASSEMBLY

This application is a continuation-in-part of U.S. patent application Ser. No. 10/321,511, filed Dec. 18, 2002 now U.S. Pat. No. 7,163,181.

TECHNICAL FIELD

The present invention relates generally to an improved mounting structure intended to movably mount and position a positionable object on a support and specifically to a magnetic mounting assembly designed to securely support and universally position a wide range of sizes and weights of positionable objects, including cameras or like devices on tripods or other supporting structures.

BACKGROUND OF THE INVENTION

Mounting an object that is required to be positioned and fixed in a potentially infinite number of locations on a support in a manner that provides stable and secure attachment while allowing universal positioning of the mounted device has long been a challenge. Over the years the prior art has proposed a number of solutions to this problem, particularly with respect to the positioning of cameras on tripods or other supports. U.S. Pat. No. 318,480 to Kendrick, for example, discloses a joint structure between a camera and tripod that enables the camera to be universally adjusted on the tripod without adjusting the tripod. The joint described in this patent includes a semispherical cup or depression that supports a ball clamped in the cup. Bearing strips located in grooves in the cup provide a secure fit while avoiding expensive turning or finishing work. A thumbscrew holds the ball in the cup once the camera has been moved to a desired position. If it is desired to move the camera to another position, the thumbscrew must be loosened, the camera positioned in the new position, and the thumbscrew retightened. This process must be repeated each time the position of the camera is changed.

A mounting apparatus for a security or surveillance camera is described in U.S. Pat. No. 5,790,910 to Haskin. This mounting apparatus, which includes a ball and socket type of connection between the camera and the support in a swivel assembly, permits adjustment of the horizontal (pan) and vertical (tilt) position of the camera. A locking screw, which secures the camera in the desired position, must be disengaged and reengaged to change the camera's position. The ball does not freely rotate in the socket unless the locking screw is disengaged; however, the locking screw must be engaged to hold the ball in the socket so the camera can maintain the desired position. This arrangement would be likely to be limited to use with relatively light weight cameras.

Symmetrical half shells define a socket in a tripod head in U.S. Pat. No. 5,772,164 to Shen. This socket supports a ball on a camera mounting platform, and a lock screw, hexagon nut and cap nut assembly are required to adjust the spacing between the half shells, so that the ball can be moved to position the camera. This multiple component structure requires unnecessarily complicated maneuvers first to move the ball so the camera is fixed in the desired position and then to insure that the camera is held in this position.

U.S. Pat. No. 6,209,830 to Brotz and U.S. Pat. No. 6,439,518 to Brotz et al disclose apparatus for mounting a camera on a tripod platform wherein a pear-shaped ball attached to the camera is inserted into a substantially cylindrical cradle cup attached to a tripod so that the camera can be rapidly mounted on or removed from the tripod. An O ring positioned in a groove in the cradle cup holds the ball in the cup. The static friction between the ball and the cup is stated to be sufficient to hold the camera in any set position, yet the sliding friction is low enough to allow easy movement of the camera to other desired positions. The nonspherical shape of the ball, however, limits the range of positions in which the camera can ultimately be fixed, and the effective frictional forces will be reduced as the components of this apparatus, particularly the O ring, are subject to wear.

A tripod head with a universal joint is described in U.S. Pat. No. 6,352,228 to Buerklin. A metal ball joint mounted in a bearing housing is releasably connectable to an axial element rotatably mounted outside and adjacent to the ball joint housing. The axial element includes a friction element, preferably made of rubber, to connect the axial element to the ball joint. The bearing housing does not conform to the configuration of the ball joint, but supports the ball by ring bearings. A clamping ring in the bearing housing is set or released to fix the ball joint in a desired position. Since the bearing housing does not support the ball in a receptacle having a corresponding radius of curvature, the range of movement of the ball, and thus the camera, is limited by this structure.

A magnetic camera support is described and shown in U.S. Pat. No. 3,286,212 to Thompson. A first part of the magnetic support is secured to a camera and a second part of the magnetic support is secured to a camera tripod. The parts are shaped to be interfitted with one another and are constructed of material with magnetic properties so that when the camera is secured to the tripod relative movement between them does not occur. A plurality of fasteners is required to hold the parts of the magnetic support together. Although this arrangement provides a secure and stable support for the camera, it does not permit universal movement of the camera relative to the support.

Ball and socket types of connectors incorporating magnets and used for diverse purposes are known. French Patent No. 2660589-A1, for example, discloses a ball and socket joint in a razor assembly that includes magnets in both the ball and the socket components of the shaving head. The relatively strong attraction of the magnets in the ball and socket components of this assembly would tend to keep the ball securely in its original position where magnet-to-magnet contact can occur, which could effectively interfere with a smooth pivoting movement, however. U.S. Pat. No. 4,719,549 to Apel shows a ball and socket connector useful for an illumination system. This connector incorporates a commercially available ball and socket joint including a magnetic holder with a hemispherical recess for receiving a ball made of a magnetic material. Since these magnetic joints must be configured to establish electrical contact, they must be conductive. The arrangement described by Apel would not be useful for positioning and holding in place a heavy object. Moreover, the magnetic ball could not be used with digital cameras or other devices that are magnetically sensitive. Likewise, the magnet-containing ball and socket joint disclosed in U.S. Pat. No. 6,350,076 to Wagner et al, which is part of an apparatus that holds surgical instruments, would not be an effective positioning and support structure for large or heavy positionable objects. The arrangement of the magnetic element relative to the ball and socket in this patent requires an actuation element to produce the axial displacement of arms attached to the ball and socket components of the system described. Such an arrangement may have a useful positioning function; however, it does not suggest how it could concurrently support and universally position a positionable object.

The prior art, therefore, fails to provide a simple magnetic mounting assembly that securely and stably supports and rapidly universally positions a wide range of sizes and weights of positionable objects on supports that employs magnetic forces to magnetize magnetizable components of the assembly, which enables the positionable device to be strongly yet movably attached to the support so that the positionable object may be easily moved and rapidly variably fixed in a selected one of an infinite range of positions relative to the support without locking devices or actuating mechanisms.

SUMMARY OF THE INVENTION

It is a primary object of the present invention, therefore, to overcome the disadvantages of the prior art and to provide an improved magnetic mounting assembly with enhanced strength that will securely hold a positionable object on a support structure while allowing the object to be universally positioned and variably fixed rapidly and easily in a selected one of an infinite number of positions without the need for locking devices or actuating mechanisms.

It is another object of the present invention to provide an improved magnetic mounting assembly for securely mounting a positionable object on a support that provides an exceptionally strong and secure support for the object.

It is a further object of the present invention to provide an improved magnetic mounting assembly for mounting a camera on a tripod that adjustably universally positions the camera to a desired position and securely holds the camera in the desired position.

It is still another object of the present invention to provide a single simple magnetic mounting assembly capable of universally positioning, securely holding in place and supporting on supports positionable objects of a wide range of sizes and weights.

It is still another object of the present invention to provide an improved magnetic mounting assembly capable of rapidly universally positioning and securely holding and supporting positionable devices that is smooth and quiet in operation.

It is a still further object of the present invention to provide an improved magnetic mounting assembly capable of universally positioning and supporting magnetically sensitive positionable objects.

It is yet a further object of the present invention to provide an improved magnetic mounting assembly that may use a permanent magnetic, an electromagnet, or a combination of magnets to position and hold securely positionable objects.

It is yet another object of the present invention to provide an improved magnetic mounting assembly with enhanced strength useful for mounting and positioning firearms, telescopes, optical instruments and the like.

It is yet another object of the present invention to provide an improved magnetic mounting assembly capable of positioning and supporting heavy positionable objects in industrial applications.

In accordance with the aforesaid objects, the present invention provides an improved magnetic mounting assembly with enhanced strength and smoothness of operation capable of stably attaching a positionable object which may be securely supported and rapidly variably fixed in a desired selected position to a support. The magnetic mounting assembly includes a positioning element attached to the device to be supported, with a magnetizable ball means to universally vary the position of the device, and a support element attached to the support. The support element includes an outer nonmagnetic housing and an inner magnetizable housing that supports a magnet assembly with a magnet portion and a magnetizable cap portion. The cap portion is spaced a functionally optimum desired distance from the inner housing and the ball means. One of a first surface of the magnet portion or a second, opposed, surface of the magnet portion is in contact with the magnetizable inner housing, while the other surface is in direct contact with the magnetizable cap portion so that the magnet portion can magnetize the inner housing and the cap portion. The inner and outer housings include surfaces configured so that the ball means is supported in spaced relationship to the support element. The spacing of the inner housing from the magnet portion of the magnet assembly and the ball means is selected to allow flux from the magnet portion to flow freely from the magnet portion to magnetize the cap portion, the housing means and the ball means. The first surface of the magnet portion corresponds to a first magnetic pole, and the second surface corresponds to a second magnetic pole opposite said first magnetic pole. The magnet portion may be a permanent magnet, an electromagnet, or a combination of permanent and electromagnets.

Further objects and advantages will be apparent from the following description, drawings and claims.

BRIEF DESCRIPTION OF THE DRAWINGS

FIG. 1 is a side exterior view of a magnetic mounting assembly in accordance with the present invention in a first selected position;

FIG. 2 is a side exterior view of a magnetic mounting assembly in accordance with the present invention in a second selected position:

FIG. 3 is an exploded cross-sectional view of one embodiment of an improved magnetic mounting assembly in accordance with the present invention;

DESCRIPTION OF THE INVENTION

Figure 5:
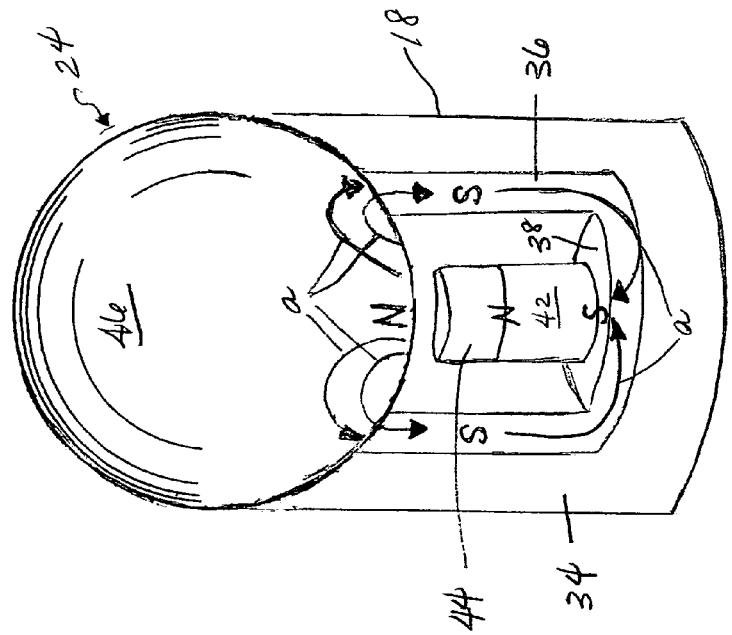
FIG. 5 is a partially cut away cross-sectional view of the magnetic mounting assembly of the present invention showing one orientation of the magnetic poles of the magnet portion of the present invention and the optimum flow of magnetic flux in this orientation.

Conventional mechanisms for supporting, holding and positioning positionable objects have frequently involved complex rather than simple construction and have not always functioned to concurrently securely and variably support and position the positionable object as effectively as might be desired. Once the supported positionable object is positioned, moreover, the holding function of these mechanisms often requires extensive adjustment and does not always insure that the positionable object will be held securely in place in the desired position. The improved mounting assembly of the present invention presents a simple structure that is light in weight and efficiently and effectively provides a secure and stable attachment between a support and a positionable object to be variably fixed in one of a desired range of infinite positions and held in the desired selected position on the support. The improved mounting assembly of the present invention employs enhanced magnetic forces to effect smooth, rapid, and quiet movement of the supported positionable object to the desired position and superior holding power and stability to maintain the positionable object in this position without extraneous locking devices.

Referring to the drawings, FIG. 1 illustrates a side view of an improved mounting assembly 10 constructed according to the present invention. The mounting assembly 10 is shown attaching a camera 12 to a tripod 14. Although the present assembly is especially well suited for this purpose, other positionable objects to be supported and positioned in a variable range of positions, including, but not limited to, firearms, telescopes, optical instruments, industrial machinery, surgical devices, and robotic arms, could also be supported and positioned by the mounting assembly 10 as described and claimed herein. Moreover, the mounting assembly 10 of the present invention can be effectively employed to secure any type of positionable object to any type of support, provided that the positionable object or the support can be adapted for attachment to the mounting assembly as will be explained below.

To achieve a strong and secure yet easily positionable attachment between the camera 12 and the tripod 14, the mounting assembly 10 is constructed with a ball and socket type of configuration. The ball and socket structure of the present invention provides an exceptionally strong, stable connection between the positionable object and its support and permits the positionable object to be moved universally to a desired selected position. The socket portion of the mounting assembly is incorporated in a support element 16 that is designed to be removably attached to a support, such as the tripod 14. One common type of attachment is shown in FIG. 1, although many other kinds of attachments are available and may be used. The support element 16 includes a mounting base 18 with a receptacle 20 extending from a support-contacting surface 19 of the support element. Since most kinds of tripods are fitted with a threaded projection, such as shaft 22, the receptacle 20 is preferably threaded so that the support element mounting base 18 can simply be screwed onto the tripod as shown. Other types of connector structures are well known and may also be employed for this purpose. The ball portion of the present mounting assembly 10 is incorporated into a positioning element 24 that is movably held within the mounting base 18 of the support element 16 as will be explained in detail below.

A connector structure 28 is provided on a pole a of the spherical positioning element 24 axially opposite the base 18. Most cameras are provided with a threaded receptacle, such as receptacle 29, that is intended to engage a corresponding threaded shaft on the tripod, such as threaded shaft 22. The connector structure 28 includes a threaded shaft 30 attached to a knob 31 that engages the threaded receptacle 29 in the camera 12. Any other suitable connector structure could also be employed to attach the camera to the positioning element 24. The connector structure 28 also includes a handle 32, preferably removably attached to one of two opposite locations on knob 31, that is used to guide the movement and facilitate the positioning of the positioning element 24 and, thus, move the camera to a desired selected position. The handle 32, which is shown to be contoured, could also be made with any other convenient shape or design.

FIG. 2 shows the mounting assembly of FIG. 1 with the camera positioned 90 degrees from the position shown in FIG. 1. The camera or other positionable object will be readily supported and held, even in this maximal position, by the present mounting assembly without a separate locking device, as will be explained in detail below. The positions shown in FIGS. 1 and 2 are only two of an infinitely variable range of positions the positionable object can occupy.

FIG. 3 illustrates the mounting assembly 10 of the present invention in an exploded cross-sectional view, showing in detail the preferred ball and socket configuration of the positioning element 24 and the support element 16. The mounting base 18 of the support element 16, which is preferably cylindrical as shown, may also be any other functional configuration, provided the critical structural parameters of the present magnetic mounting assembly are met. The mounting base 18 is preferably formed with a nonmagnetizable outer housing 34 that includes the threaded receptacle 20 for receiving a threaded shaft from a tripod or other support. The outer housing 34 is preferably formed of a hard plastic material, although other suitable nonmagnetizable materials could also be used, provided they are sufficiently strong and lightweight. The particular application in which the mounting assembly is to be used will determine the choice of materials. A plastic material particularly effective for this purpose is DERLIN (trademark), available from Dupont. The mounting base 18 also includes a magnetizable inner housing or cup 36, preferably formed of steel or another readily magnetizable material, supported within the outer housing 34. The outer and inner housings 34 and 36 include positioning element contact surfaces 35 and 36, respectively, that form a socket to hold the positioning element 24. The inner housing includes a platform 38 on which is supported a magnet assembly 40. The magnet assembly 40 includes a magnet 42 with one surface in direct contact with the platform 38 of the magnetizable inner housing 36 and an opposite surface in direct contact with a magnetizable cap 44. The cap 44, while preferably formed from steel, may be formed from any other suitable magnetizable material, preferably the same magnetizable material chosen for the housing 36. The preferred configuration for the magnet assembly 40 will be cylindrical to maintain a functionally optimum physical separation between the cap 44 and inner housing or cup 36, as will be discussed below in connection with FIG. 5. The cap surface 45 not in contact with the magnet 42 should be substantially concave, having a radius of curvature approximating that of the positioning element 24. The magnet assembly 40 is sized and positioned to maintain a functionally optimum spacing between it and the inner housing 36.

The preferred configuration of the positioning element 24 is the spherical ball 46 shown in FIG. 3. The ball may be hollow as shown or may have a solid construction and is formed of a magnetizable material, preferably steel. The ball 46 may also be formed of a nonmagnetizable material, such as a suitable plastic, covered by a layer of a magnetizable material, such as steel. The specific choice of material will depend on the ultimate application of the magnetic support assembly. The primary requirement is that the ball 46 be formed to include a material that may be readily magnetized to conduct magnetic flux. The positioning element contacting surfaces 35 and 37 in the respective housings 34 and 36 are configured to securely receive a sufficient portion of the ball 46 to produce a secure fit. The configuration of the surfaces 35 and 37 should therefore be selected to correspond to and have the same radius of curvature as the spherical configuration of the ball 46.

The structural components of the mounting assembly of the present invention employ magnetic forces to provide a unique positioning and support structure that stably and securely attaches a positionable object to a support so that the positionable object can be universally positioned and variably fixed in a desired position. As a result, the present invention achieves an especially strong and secure fit between components and superior positioning and support functions not produced by available ball and socket or magnetic positioning and support structures. This is due to the structure and the arrangement of magnetic, nonmagnetic, and magnetizable elements of the present mounting assembly. The support element mounting base 18 includes a-magnet assembly 40 located within an inner magnetizable housing 36. The surfaces 35 and 37 of the respective outer and inner housings 34 and 36 have a radius of curvature corresponding to the radius of curvature of the ball 46 and are sized to produce a snug fit between the exterior surface 48 of the ball 46 and the mounting base 18 so that magnetic forces and, to a lesser extent, frictional forces will maintain these components in place. The primary force that holds these components in place, however, is the force of the magnet 42, as will be explained in detail below.

Many kinds and arrangements of magnets are suitable for holding the ball 46 in contact with the housings 34 and 36 of the mounting base 18. The type of magnet selected will depend, in large measure, on the specific application of the magnetic mounting assembly. The magnet optimally should be strong enough to hold the positionable object in the position shown in FIG. 2, which requires maximum holding power. A single permanent magnet having the configuration of magnet 42 can be used. Alternatively, a cluster of smaller permanent magnets can be arranged to approximate the configuration of magnet 42. Another alternative is to use a layered magnet structure, wherein thin permanent magnets positioned with their poles aligned are alternately layered with steel to form a magnet with the configuration of magnet 42. Yet another alternative employs an electromagnet to replace magnet 42. An array of timed electromagnets, for example, could also replace magnet 42 in industrial or other applications to allow the automatic positioning of the positionable object. U.S. Patent Publication No. US 2002/0096956 AI, the disclosure of which is incorporated herein by reference, describes the use of a plurality of electromagnets spaced about a spherical surface that are positioned and controlled to move the spherical surface relative to another spherical surface. An arrangement of this type could be employed to automatically move the magnetic mounting assembly of the present invention to position a large telescope in an observatory, for example. A combination of permanent magnets and electromagnets could also be used for magnet 42.

Another consideration in selecting an appropriate magnet for the mounting assembly is the environment in which the mounting assembly is to be used. For example, some industrial applications could require operation of the mounting assembly at very high or low temperatures and/or pressures. A magnet that would withstand such an environment is required. If the present mounting assembly is used in satellite positioning devices, for example, a magnet that would function effectively at low temperatures would be needed. The use of the mounting assembly to support and position a camera as shown and described in connection with FIGS. 1 and 2 would occur primarily at ambient temperatures. A high strength rare earth magnet composed of neodymium, iron and boron (Nd—Fe—B) has been found to function as required for this application and is especially preferred. A wide range of other magnetic materials, including, but not limited to, iron nickel and selenium cobalt, will also be suitable for forming magnet 42. The field strength of the magnet, which is the inverse of the cube of the distance from the magnet to the magnetizable material of ball 46, will be a factor for consideration in selecting an optimum magnet for the present magnetic mounting assembly.

If a hollow ball 46 is used, the thickness of the wall between the exterior surface 48 and the interior surface 50 of the ball 46 will depend on the size of the ball and the application of the mounting assembly. The optimum thickness of the wall will depend on the strength of the magnet 42 and should be proportional to the magnet strength. For many applications the ball 46 will have a diameter within the range of about 1.0 to 5.0 inches, although industrial applications will require much larger balls and robotic or surgical applications will require smaller balls. A 3.0 inch diameter ball is preferred for a mounting assembly connecting a camera to a tripod. A hollow steel ball having a wall thickness in the range of 0.005 to 0.012 inches is preferred when the mounting assembly of the present invention has a 3.0 inch diameter ball and is used to mount a camera to a tripod.

The connector structure 28 located at pole a of the ball 46 includes a plug 54, which may be threaded as shown in FIG. 3, to close the an aperture 52 in the hollow ball 46. Alternatively, the connector structure 28 could be secured to the outer surface 48 of a hollow or solid ball 46. As described above, a camera or other device is attached to the connector structure by the threaded shaft 30 or some other conventional means. The connector structure knob 31 is attached securely to the ball 46 so that the handle 32 can be used to move the ball 46 universally in the mounting base 18 to position and variably fix the camera or other device in a desired orientation.

Figure 4:
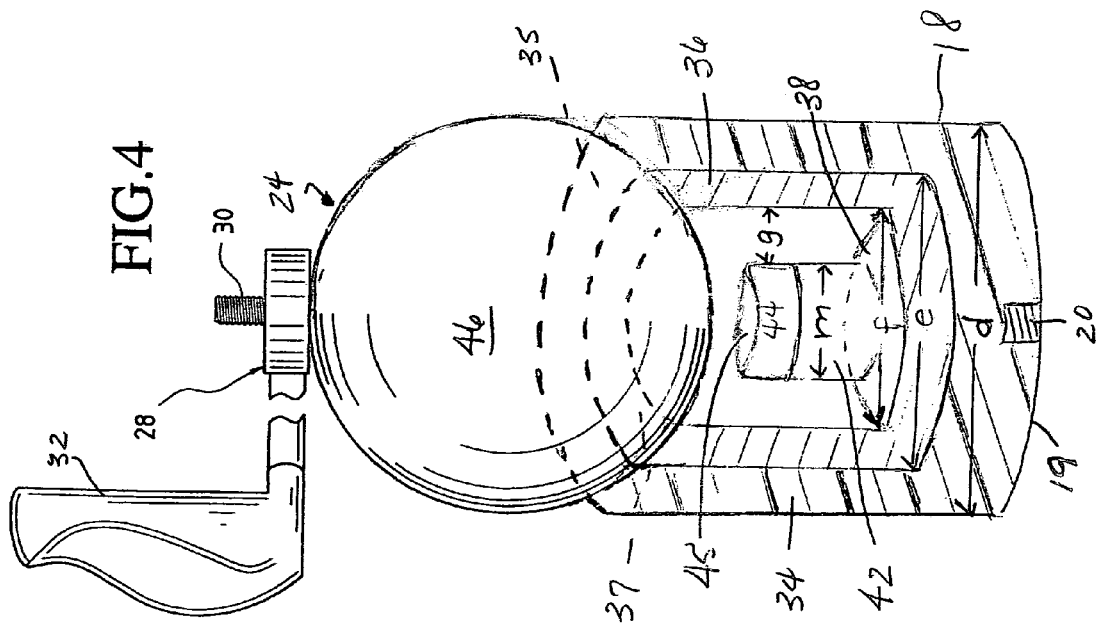
FIG. 4 is a partially cut away cross-sectional view of the mounting base of the magnetic mounting assembly in accordance with the present invention.

FIG. 4 illustrates, in partially cut away perspective, one possible configuration of the mounting base 18 and ball 46 of the improved magnetic mounting assembly of the present invention. In this configuration the ball 46 is shown to be supported by the surfaces 37 and 35, respectively, of the inner and outer housings 36 and 34 of the mounting base 18. The magnet 42 of the magnet assembly 40 directly contacts the magnetizable inner housing or cup 36, and the magnetizable cap 44 is positioned between the magnet 42 and the ball 46. The cap 44 is configured to maintain a functionally optimal spacing from the ball 46. In this embodiment, if the ball is selected to have a diameter of one (1.00) inch, the diameter d of the nonmagnetizable outer housing 34 would also be one (1.00) inch. The outer diameter e of the inner magnetizable housing 36 would be 0.80 inch, the inner diameter f of the housing 36 would be 0.60 inch, and the diameter m of the magnet assembly 40 would be 0.30 inch, so that the separation gap g between the cap 44 and the inner housing 36 would be 0.30 inch. A magnetic mounting assembly with these dimensions would be particularly useful for digital and like applications. This relative scaling is preferred and can be easily adjusted for other applications using balls with larger diameters.

FIG. 5 illustrates the mechanism by which the magnetic mounting assembly of the present invention functions to produce an especially strong and secure attachment and fit between the mounting base 18 and the ball 46 and also produces particularly quiet positioning of a positionable object. The cross-hatching indicating the cross-sections of the mounting base have been eliminated to illustrate more clearly the operation of the magnetic mounting assembly. The magnet 42 is located on the platform 38 of the magnetizable inner housing 36 so that the south pole S of the magnet 42 contacts surface 38 and the north pole N of the magnet 42 contacts the cap 44. If desired, the position of the magnet 42 could be reversed so that the north pole of the magnet 42 directly contacts the platform 38 and the south pole of the magnet 42 directly contacts the magnetizable cap 44. The magnetizable cap 44 and the magnetizable inner housing 36 are, as noted above, physically separated by a separation gap g, as shown in FIG. 4. The extent of the physical separation or gap must be functionally optimal. Specifically, the size of the separation gap g, which is the spacing between the cap 44 and the housing 36 must be selected to allow the magnetic flux from the magnet 42 to travel readily from the magnet 42 through the cap 44, into the magnetizable ball 46, through the magnetizable housing 36 and back to the magnet 42, as shown by the arrows a in FIG. 5. The cap 44 and the ball 46 are magnetized to behave like the south pole of the magnet and the inner housing 36 is magnetized to behave like the north pole of the magnet, although these functions can be reversed by reversing the orientation of the magnet 42. The resulting magnetic attraction between the magnetized ball 46 of the positioning element 24 and the and the magnetized inner housing 36 and magnetized cap 44 of the mounting base 18 produces an exceptionally secure and stable attachment capable of supporting and positioning even very heavy objects. To achieve this result, the vertical strength of the magnet must be great enough to hold the ball in contact with surfaces 35 and 37 of the mounting base 18. The distance of the separation gap between the ball 46 and the cap 44 must be taken into account when selecting the strength of the magnet 42. The magnet 42 should be strong enough to produce optimum support and positioning of the desired positionable object.

Any sliding friction produced between the outer surface 48 of the ball 46 and the surfaces 35 and 37 of the outer and inner housings 34 and 36, respectively, of the mounting base 18 can be reduce by the application of a layer of felt or a similar friction-reducing nonmagnetizable material. Such materials are known to those skilled in the art and must be selected to avoid interference with the travel of magnetic flux through the mounting assembly as described above.

Figure 6:
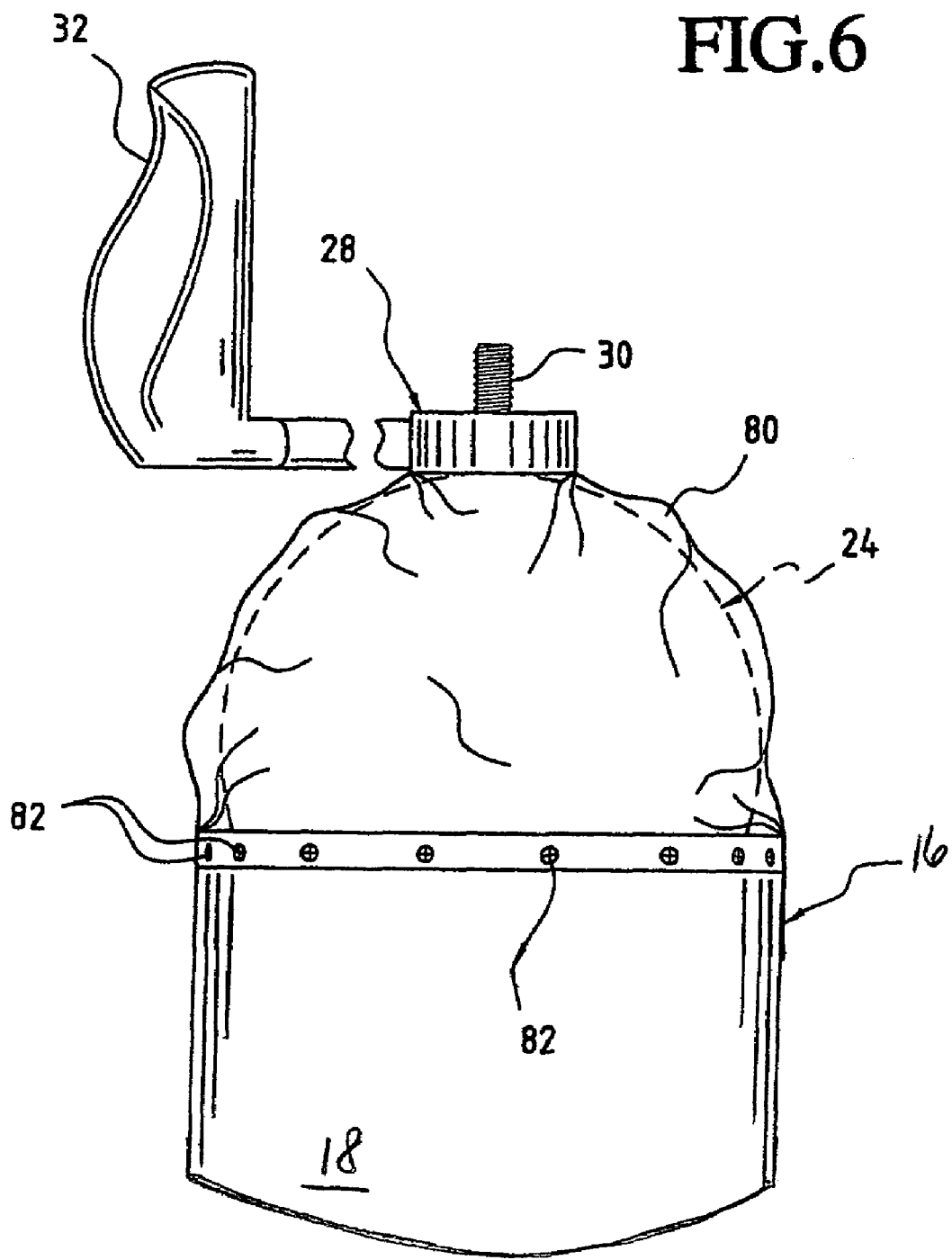
FIG. 6 is an exterior side view of the magnetic mounting assembly of the present invention including a protective gaiter.

FIG. 6 shows a mounting assembly according to the present invention fitted with a protective cover or gaiter 80 that may be made of leather, rubber or a suitable synthetic material. The gaiter 80 is shaped to fit over the positioning element 24 so that the positioning element 24 can be freely moved by the handle 32 on the connector structure 28. The gaiter 80 is preferably attached to the mounting base 18 as shown by fasteners 82. Any suitable fastener, including snaps and the like, that will permit the removal and reattachment of the gaiter 80 over the positioning element 24 can be used. While the gaiter is used primarily for aesthetic purposes, it also serves a protective function and keeps metal particles and other detritus away from the magnetic portions of the mounting assembly.

While the improved mounting assembly of the present invention has been described to support and position a camera or like device on a tripod, it may be used to support and position a wide range of other positionable objects and is especially useful for supporting and positioning magnetically sensitive objects, such as digital cameras and the like. The present magnetic ball and socket mount may be used as a mount for a rifle or other type of firearm. In addition, the mounting assembly of the present invention could be used to support and position optical instruments, including telescopes and the like, and also to support and position surveillance cameras. Industrial applications using a large version of the present mounting assembly to support and position positionable objects in industrial processes conducted at temperatures and pressures significantly above or below ambient temperature are additionally contemplated. The magnetic ball and socket connector described in connection with the present mounting assembly could further be used as a joint connector in overhead light assemblies such as those commonly used in dental and medical applications or in joint assemblies for robotic and surgical applications.

INDUSTRIAL APPLICABILITY

The improved magnetic mounting assembly of the present invention will find its primary application in mounting and positioning many different types and sizes of positionable objects on supports so that these positionable objects may be universally positioned and securely held in the desired position during operation. The magnetic mounting assembly of the present invention may also be effectively employed in other applications in which it is desired to securely attach and universally vary the position of any apparatus that is required to be variably fixed in a selected position during the operation thereof.

I claim:

1. A magnetic mounting assembly capable of securely and stably attaching a positionable object to be universally positioned and variably fixed in a desired selected position by magnetic forces to a support, wherein said mounting assembly comprises:
   (a) a positioning element attached to said positionable object including a ball means formed of a magnetizable material for universally varying the position of said positionable object;
   (b) a support element in supporting contact with said support, wherein said support element includes an outer nonmagnetizable housing supporting an inner magnetizable housing, said outer and inner housings having ball supporting surface means correspondingly configured to said ball means to movably securely hold and universally position said ball means in said support element; and
   (c) magnet means, including a magnet portion in direct contact with a platform surface of said inner housing and a magnetizable cap portion having a first surface in contact with said magnet portion and a second, opposed surface spaced a functionally optimal distance from said inner housing and from said ball means for producing the magnetic forces to magnetize the magnetizable inner housing, cap portion and ball means, thereby securely and movably attaching said positionable object to said support.

2. The magnetic mounting assembly described in claim 1, wherein said ball means has a spherical configuration.

3. The magnetic mounting assembly described in claim 2, wherein the second surface of the magnetizable cap portion is correspondingly configured to the spherical configuration of said ball means to receive said ball means in spaced relation thereto.

4. The magnetic mounting assembly described in claim 1, wherein said magnet portion of said magnet assembly has a north pole and a south pole, and said magnet portion may be positioned with either said north pole or said south pole in contact with said the platform surface of the inner housing.

5. The magnetic mounting assembly described in claim 4, wherein said first surface of said magnetizable cap portion of said magnet assembly is positioned adjacent to the pole of said magnet portion not in contact with said inner housing.

6. The magnetic mounting assembly described in claim 1, wherein said functionally optimum distance is selected to permit the optimum travel of magnetic flux from said magnet portion to magnetize said inner housing, said cap portion and said ball means.

7. The magnetic mounting assembly described in claim 1, wherein said ball means is formed from steel, said inner housing is formed from steel and said magnetizable cap portion is formed from steel.

8. The magnetic mounting assembly described in claim 7, wherein said nonmagnetizable outer housing is formed from a lightweight plastic.

9. The magnetic mounting assembly described in claim 8, wherein said magnet portion is a neodymium-iron-boron magnet.

10. The magnetic mounting assembly described in claim 9, wherein said ball means has a diameter in the range of 1.0 to 5.0 inches.

11. The magnetic mounting assembly described in claim 7, wherein said ball means is a hollow sphere.

12. A magnetic mounting assembly capable of securely and stably attaching a positionable object to be universally positioned and variably fixed in a desired selected position by magnetic forces to a support, wherein said mounting assembly comprises:
   (a) magnetizable ball means formed of steel attached to the positionable object for universally varying the position of the positionable object;
   (b) a support element on said support to support the ball means, said support including an outer housing formed of plastic supporting an inner magnetizable housing formed of steel, said inner and outer housings having ball supporting surfaces correspondingly configured to securely hold and universally position said ball means; and
   (c) magnet assembly means including a magnet supported on a first side in direct contact with the inner housing and on an opposite side in direct contact with a magnetizable steel cap portion, said cap portion being spaced a functionally optimum distance from said inner housing and from said ball means for producing said magnetic forces to magnetize the magnetizable inner housing, cap portion and ball means, thereby movably attaching said positionable object to said support.

13. The magnetic mounting assembly described in claim 12, wherein either the north pole of said magnet or the south pole of said magnet may be positioned in direct contact with said inner housing to magnetize the magnetizable inner housing, cap portion and ball means.

14. The magnetic mounting assembly described in claim 13, wherein the magnet is a neodymium-iron-boron magnet.

15. The magnetic mounting assembly described in claim 14, wherein said functionally optimum distance is selected to permit the optimum travel of magnetic flux from said magnet to magnetize the inner housing, the cap portion and the ball means.

16. The magnetic mounting assembly described in claim 14, wherein said ball means has a diameter in the range of 1.0 to 5.0 inches.

* * * * *